United States Patent [19]
Morris

[11] Patent Number: 5,130,104
[45] Date of Patent: Jul. 14, 1992

[54] HIGH PRESSURE OXYGEN FURNACE
[75] Inventor: Donald E. Morris, Kensington, Calif.
[73] Assignee: Regents of The University of California, Oakland, Calif.
[21] Appl. No.: 326,374
[22] Filed: Mar. 21, 1989
[51] Int. Cl.[5] .................................. B01J 3/06
[52] U.S. Cl. .................................. 422/240; 422/242; 505/1
[58] Field of Search ............... 422/242, 240; 505/1

[56] References Cited
U.S. PATENT DOCUMENTS
1,159,865 11/1915 Pier .
2,547,521 4/1951 Buehler .
3,201,203 8/1965 Cerveny ........................... 422/242

Primary Examiner—Jill A. Johnston

[57] ABSTRACT

A high temperature high pressure oxygen furnace having a hybrid partially externally heated construction is disclosed. A metallic bar fabricated from an alloy having a composition of at least 45% nickel, 15% chrome, and 10% tungsten is utilized (the preferred alloy including 55% nickel, 22% chrome, 14% tungsten, 2% molybdenum, 3% iron (maximum) and 5% cobalt (maximum). The disclosed alloy is fabricated into $1\frac{1}{4}$ inch bar stock and has a length of about 17 inches. This bar stock is gun drilled for over 16 inches of its length with 0.400 inch aperture to define a closed high temperature, high pressure oxygen chamber. The opposite and closed end of the bar is provided with a small support aperture into which both a support and a thermocouple can be inserted. The closed end of the gun drilled bar is inserted into an oven, preferably heated by standard nickel chrome electrical elements and having a heavily insulated exterior.

10 Claims, 2 Drawing Sheets

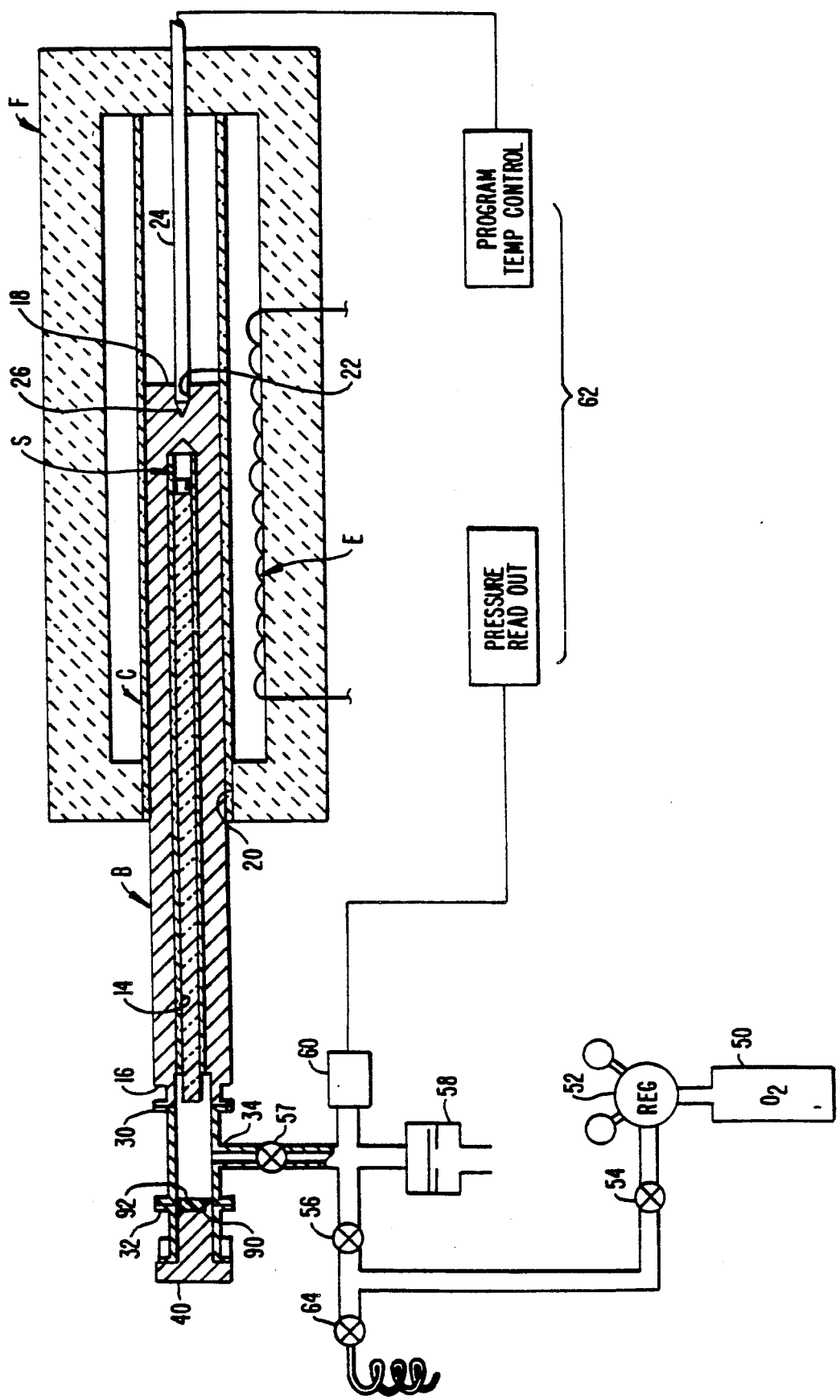
FIG._1.

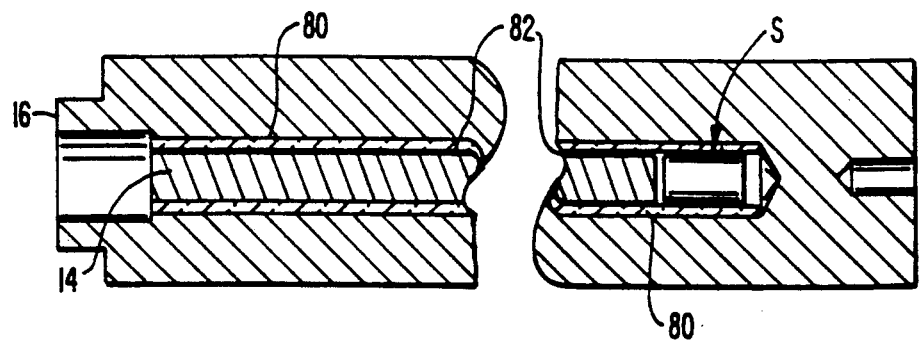
FIG._2.
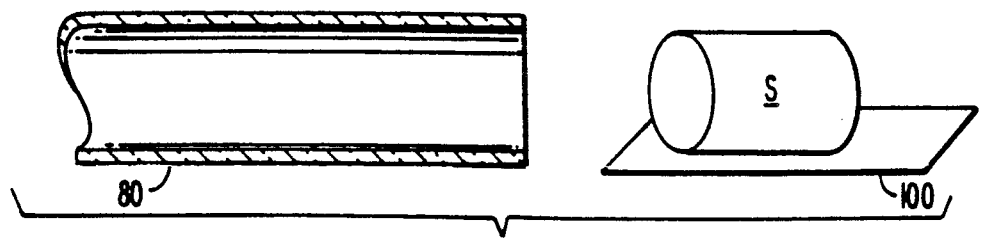
FIG._3A.
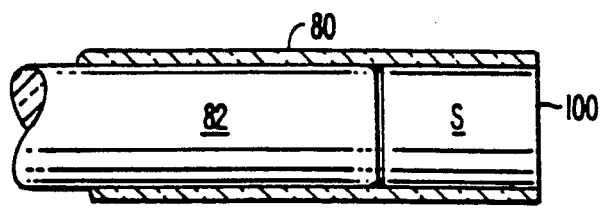
FIG._3B.
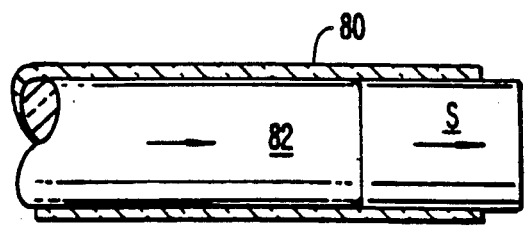
FIG._3C.

HIGH PRESSURE OXYGEN FURNACE

GOVERNMENT RIGHTS

The invention described herein arose in the course of or under Contract No. De-AC03-76-SF-00098 between the Department of Energy and the University of California at Berkeley.

This invention relates to high pressure oxygen furnaces having utility for the synthesis of high temperature superconductors.

SUMMARY OF THE PRIOR ART

There are two general types of high pressure furnace systems capable of heating materials in the presence of high pressure oxygen.

The first furnace system is the "internally heated" system which entails placing a furnace system inside a pressure vessel. This design has several drawbacks.

Since the sample, thermal insulation and electrical heating element must go inside the pressure vessel, the pressure vessel must be large. This is disadvantageous for two reasons.

First, the larger the volume of the pressure vessel, the more oxygen will be contained, and pressurized oxygen is hazardous.

Second, the large pressure vessel must withstand high pressures. Large vessels for withstanding high pressures are quite expensive.

Furthermore, the cost of the heating element will be high. Platinum is the only metal that can withstand high pressure oxygen at high temperature.

An advantage of this type of construction is the possibility of use at very high pressures and temperatures. This high temperature and high pressure is possible because the heated region is separate from the pressure containment.

An additional advantage of the internally heated system is that the sample and heating element, which achieves and contains the high temperatures, are surrounded by insulation inside of the vessel. The pressure containing vessel is not exposed to high temperatures and can be made of high strength steel to withstand very high pressure.

Furthermore, and internally heated system, the platinum electrical heating element and the insulation can withstand high temperature (up to ~1500° C.) and do not have to be stressed to contain the pressure.

The second general type of high pressure oxygen furnace system is the "externally heated system". In this system, the pressure vessel is inserted inside the furnace.

The main advantage of this design is that the pressure vessel is very small.

First, this limits oxygen volume to a very small amount and minimizes the potential hazard.

Second, the small size of the vessel also makes it less expensive. Since the furnace heating element and insulation surround the pressure vessel, they are not exposed to high pressure or concentrated oxygen. This allows use of an economical, conventional, electrically heated furnace with base metal heating element.

This type of system has two disadvantages.

First, the furnace can only achieve limited temperatures and pressures because oxygen attacks most metals under high pressure at a high temperature.

Second, most metals burn with exposure to high pressure oxygen. This includes some of the strongest metals, such as titanium alloys, which react violently with high pressure oxygen and must be protected.

Those metals that do not burn, such as the noble metals, platinum, gold, etc. become soft with repeated exposure to high temperatures. Therefore they are unsuitable for pressure vessels. They are also very expensive.

Many metals and high strength alloys that do not burn or turn soft become embrittled upon exposure to high temperatures e.g., Haynes Alloy No. 214, (76% Ni, 16% Cr, 3% Fe, 4.5% Al, Y) becomes very brittle because of formation of $Ni_3Al$ gamma prime in the temperature range of 600° C.-950° C. (page 2, Haynes Alloy No. 214 booklet, Cabot Corporation, Kokomi, Ind 46902).

It should be understood in these types of externally heated high pressure oxygen ovens because the oven is being heated and cooled each time the furnace system is used, the pressure vessel is likely to embrittle and deteriorate more quickly.

Temperatures of over 900° C. are necessary to make many superconductors. See Donald E. Morris, U.S. patent application entitled Super Conductor, Ser. No. 263,750, filed Oct. 28, 1988. However, commercially available externally heated high pressure furnaces cannot reach the needed temperatures. They are mainly intended for inert atmospheres (as distinguished from oxygen), and are surely not rated to withstand the attack of hot concentrated (high pressure) oxygen.

A supplier of pressure vessels and reactors for use at high temperature and pressure is Leco Corporation, Tem-Pres Division, Bellefonte, Pa. 16823. They manufacture pressure vessels of materials identified as: 1) 316 Stainless Steel, 2) Unitemp L-605, 3) Rene and 4) $Rene^2$. According to Leco, 316 Stainless Steel is rated for a maximum temperature of 550° C., Unitemp L-605 and Rene are rated to a maximum of 750° C. and $Rene^2$ attains 900° C. (Specification sheets LRA-488 and MRA-1085, Leco Corporation, Tem-Pres Division).

Another supplier of such apparatus is Parr Instruments, Moline, Ill. 61265. They produce pressure vessels of 1) Monel 400, 2) Inconel 600, 3) Hastelloy C-276, 4) Hastelloy B-2, 5) Titanium, 6) Nickel, 7) Zirconium, 8) Carpenter 20Cb-3, 9)C1018 carton steel, 20) 303 Stainless Steel and 11) 316 Stainless Steel (pages 8-10, Parr Instruments "Reactors and Pressure Vessels" catalog). According to page 11 of Parr Instruments catalog, the maximum temperature of any of these materials is only 600° C., specified for 316 Stainless Steel, Inconel 600, and Hastelloy C-276. It is clear that all of these available pressure vessels are inadequate for synthesizing or heat treating superconducting materials at temperatures in the range of 1000° C. at high pressures.

SUMMARY OF THE INVENTION

A high temperature high pressure oxygen furnace having a hybrid partially externally heated construction is disclosed. A metallic bar fabricated from an alloy having a composition of 55% nickel, 20% Chromium, and 10% tungsten is utilized (the preferred alloy including 55% nickel, 22% Chromium, 14% tungsten, 2% molybdenum, 3% iron (maximum) and 5% cobalt (maximum). The disclosed alloy is fabricated into 1¼ inch bar stock and has a length of about 17 inches. This bar stock is gun drilled for over 16 inches of its length with 0.400 inch aperture to define a closed high temperature, high pressure oxygen chamber. The opposite and closed end of the bar is provided with a small support aperture into which both a support and a thermocouple can be inserted. The closed end of the gun drilled bar is inserted into an oven, preferably heated by standard nickel chromium electrical elements and having a heavily insulated exterior. That portion of the bar within the oven is covered with a dielectric and closely fitting external fused quartz cylinder having a dimension sufficient to accommodate both thermal expansion and reasonable amounts of inevitable pressured induced creep in the bored metallic bar. As inserted into the oven, the closed end of the bar is supported at a protruding support which also contains a thermocouple for the monitoring of chamber temperature. The portion of the bar remote from the oven protrudes from the oven and because of the low thermal conductivity of metallic bar is cool to the touch, although its opposite end is heated up to temperatures in the range of 1000° C. Therefore standard fittings for the supply of high pressure oxygen can be used having high resistance to the chemical action of the high pressure oxygen. Samples are inserted by and within the remote end of an internal quartz tube fitting inside of the bore of the gun drilled metallic bar, the sample being inserted into the high pressure, high temperature closed end of the gun drilled bar. The sample is preferably wrapped in gold foil to permit ease of removal from the interior end of the internal quartz tube. A fused quartz rod occupies the void portion of the quartz tube to reduce oxygen volume. Once placed within the oven and sealed, samples can be heated to temperatures of 1000° C. in oxygen having pressures ranging from 2000 to 8000 psi. The gun drilled bar constituting the chamber of the oven undergoes gradual creep proportional to the pressure used, the gradual creep being a characteristic of the alloy utilized. This gradual creep while limiting the life of the oven dependent upon the pressures used, has the advantage of distributing generated hoop stresses immediate the high temperature, high pressure chamber by the pressure induced creep. This distribution of stress causes the entirety of the bar to receive the pressure induced hoop stress and slows down the creep in the metal walls adjacent the pressure chamber to a rate which imparts a commercially acceptable life to the oven. The fused quartz, both within and without the oven, has the advantage of permitting the ready penetration of heating infrared rays at temperatures above 600° to 700° C. and therefore readily transfers heat. Upon completion of treatment, the sample is withdrawn from the oven utilizing the quartz tube which is exposed once the oven is unsealed. Once the quartz tube is withdrawn, the sample is ejected wrapped in the gold foil utilizing a quartz rod to dislodge the sample at the distal end of the inserted fused quartz tube. The dielectric quartz cylinder surrounding the bar monitors the life of the gun drilled bar stock against the stress induced creep and signals the end of oven life by telltale cracking.

Other Objects, Features and Advantages

An object of this invention is to disclose a hybrid externally heated high temperature, high pressure oxygen oven having utility for the fabrication of superconductor compounds. Bar stock of a selected alloy is utilized. The alloy includes at least 45% nickel, 15% chromium, 10% tungsten. Bar stock of dimension of about 1¼ inches diameter and 17 inches in length is gun drilled to a bore in the range of 0.400 inches for about 16 inches of its full length. The closed end of the bar stock only is inserted into a conventional oven and forms the high pressure, high temperature oxygen chamber for the treatment of materials forming superconductors. The opposite and open end of the gun drilled bar stock protrudes from the oven and enables conventional oxygen fittings to supply the necessary high pressure oxygen.

An advantage of the disclosed alloy is properly of having inevitable temperature and pressure induced creep. This creep while having the disadvantage of limiting the oven chamber life due to chamber expansion, has the advantage of distributing stress induced by the creep over the entirety of the diameter of the bar. There results an oven which has a commercially acceptable life against the inevitable creep.

A further advantage of the alloy is that it does not form metallic phases that cause the metal of the oven chamber to become brittle or otherwise loose the necessary strength to resist both the temperature and pressure. It will be understood that a brittle oven chamber containing high temperature and high pressure oxygen is dangerous.

Yet another advantage of this invention is that the disclosed alloy has low thermal conductivity. Accordingly, one end of the oven chamber can be heated up to 1000° C. while the opposite end of the chamber is cool to the touch. Consequently, ordinary pressure fittings having resistance to chemical action with the contained high pressure oxygen can be used at the "open" end of the oven chamber for the introduction of oxygen.

A further object of this invention is to disclose the use of a fused quartz cylinder around the oven chamber. Preferably, the closed end of the oven chamber is inserted within an electric oven having electric heating elements and high levels of insulation. A fused quartz exterior cylinder is placed around the oven. This fused quartz exterior cylinder dielectrically insulates the oven from the electric heating element of the oven chamber and monitors against pressure and temperature induced creep. When the oven chamber ends its designed in service life because of the pressure induced creep, telltale cracking of the quartz cylinder provides an unmistakable indication of end of in service life creep expansion.

An advantage of the quartz tube surrounding the oven chamber is that it provides little resistance to heat transfer to the oven chamber. At temperatures above about 600° C. the quartz becomes transparent to heating infrared radiation. Consequently, only small temperature lag of the oven chamber due to the surrounding quartz is present.

A further object of this invention is to disclose a means for the rapid insertion and withdrawal of treated sample from the oven. Accordingly to this aspect of the invention, an internal fused quartz tube is utilized. The internal fused quartz tube has the sample to be treated placed therein at an end of the tube. Preferably, the sample is wrapped in gold foil. The tube is thereafter inserted to the gun drilled bore so as to place the sample in the high temperature, high pressure closed end of the oven. That portion of the cylinder not occupied by the sample is filled with a fused quartz rod, leaving only sufficient clearance for the penetration of the high pressure oxygen.

An advantage of the internal quartz cylinder is that the sample can be inserted and withdrawn using the cylinder. For example, withdrawal of the treated sample within the cylinder can occur with ejection from the cylinder occurring responsive to the insertion of an ejecting rod—preferably also of fused quartz.

A further advantage of the internal quartz cylinder is that the end of the oven adjacent the internal quartz cylinder may be relieved so that the distal end of the cylinder is exposed for grasping. In this way the relatively cool end of the cylinder can be manipulated for the removal of the sample after treatment.

An advantage of the gold foil is that if the sample decomposes or crumbles interior of the high temperature, high pressure portion of the oven, the sample is nevertheless easily removed.

An advantage of the entire oven pressure chamber and external furnace is that the entire system, including the oven, easily fits within a safety chamber to guard against possible explosion.

BRIEF DESCRIPTION OF THE DRAWINGS

Other objects, features, and advantages of this invention will be more apparent after referring to the following specification and attached drawings in which:

FIG. 1 is a schematic illustrating the hybrid internal high pressure, high temperature oxygen oven inserted to an electric oven at the high temperature end and connected to a high pressure oxygen source at the opposite and cool end;

FIG. 2 is a detail of the machined metallic chamber used for the high pressure, high temperature oxygen treatment;

FIGS. 3A-3C are a cartoon series showing the respective preparation of a sample for insertion to the tube of the invention (FIG. 3A), placement of the sample and tube with space occupying rod just before insertion to the oven chamber (FIG. 3B), and ejection of the sample from the internal tube immediately after treatment (FIG. 3C).

DETAILED DESCRIPTION OF THE INVENTION

This invention consists of an externally heated pressure vessel (pressure vessel inserted inside the furnace) made of a strong, non-hardening, heat and pressure resistant alloy. A suitable alloy is Haynes Alloy No. 230, which is specified to withstand stress at high temperatures in air. However no specifications are given under conditions of exposure to concentrated (high pressure) oxygen at high temperatures. I have found that this material can in fact withstand such conditions. Haynes Alloy No. 230 is composed of (~55% Ni, 22% Cr, 14% W, 2% Mo, 3% Fe (max), 5% Co (max). Tungsten and molybdenum content gives this material excellent strength and long term thermal stability (low creep).

Referring to FIG. 1 a description of the overall system can be made. The bar B is illustrated having a concentric bore 14. Bore 14 begins at a machined end of the bar 16 and continues to and terminates at the closed end of the bar 18. Bore 14 is in the order of 4/10ths of an inch in diameter. The bar is approximately 17 inches long with the bore being in the order of 16 inches.

The sample S is placed within the bore 14 adjacent the end 18 of the bar. The bar is in turn placed within a furnace F having heating elements E connected to an electric power source (not shown). Furnace F contains high levels of insulation and is open at an opening 20 to permit the bar to be inserted into and exposed to the high heat generated therein.

Preferably there is bored a bore 22 in the end 18 of the bar. Into this bore 22 there is placed a support probe 24 having a thermal couple 26 at the end thereof. Thus bar B is supported within the oven away from the heating element E.

Preferably a quartz cylinder C circumscribes the circular B as it extends within the furnace F. This cylinder C has clearance on the outside of the bar B sufficient to permit normal thermal expansion and creep within the metal to occur. Once creep proceeds beyond the inside dimension of the quartz cylinder C, telltale cracking of the cylinder C will indicate the need for the replacement of the bar B.

It will be understood that end 18 and the sample S are elevated to temperatures in the order of 1000° C. The opposite end of the bar B at 16 remains at ordinary temperatures. Consequently, a standard fitting 30 and fitting 32 at a T 34 can be utilized. An end plug 40 seals the furnace.

Oxygen is supplied from a cylinder 50 through a regulator 52 by opening of valves 54, 56. A burst disk safety valve 58 is provided and a pressure readout 60 provides a reading to a control panel at 62. Opening of respective valves 56, 64 serves to bleed high pressure oxygen to atmosphere after treatment of the sample S.

Referring to FIG. 2 our pressure vessel is a thick walled vessel made by boring a hole through a 17 inch length of 1¼ bar of my special metal described above. It has been found that it is feasible to do this by the method of gun drilling approximately 16 inch of the length of the bar. The end of the vessel is outside the furnace and remains cool, so standard fittings can be used. These can be of 316 stainless steel.

Referring further to FIG. 2 the interior of the oven construction can be understood. Bar B has bore 14 filled from end 16 with an internal quartz cylinder 80. Internal quartz cylinder 80 holds at the end sample S which sample S is wrapped in gold foil (hereinafter explained with respect to FIGS. 3A-3C). That portion of the quartz cylinder 80 not occupied by sample S is filled with a quartz rod 82. A standard fitting 30, 32 is utilized to have an end plug 40 screwed into and close the opposite end of the bar. Fitting is preferably provided with an indentation 90 exposed to the chamber having a TEFLON® gasket 92. It has been found that after opening of the oven during high pressure oxygen treatment, pressure can force quartz rod 80 against the TEFLON® gasket 92, the presence of the gasket preventing breakage of the quartz tube 80 (and rod 82).

Referring to the cartoon series of FIGS. 3A-3C preparation of a sample for insertion to the oven is shown with respect to FIGS. 3A and 3B.

Referring to FIG. 3A a sample S is ready to be wrapped in gold foil 100 and in preparation of placement interior of internal cylinder 80. Referring to FIG. 3B sample S covered with the gold foil 100 is inserted interior of the cylinder 80. The internal volume of the cylinder 80 is occupied by a quartz rod 82 leaving only sufficient interstitial area interior of the oven for the high pressure oxygen to find its way interior to the sample.

Referring to FIG. 3C rod 80 is shown after withdrawal from the oven. The sample S is being ejected by motion of the rod 82 from the tube 80. It can be seen that the internal quartz cylinder readily permits such removal.

It will be understood that quartz is particularly advantageous both in the exterior cylinder C and in the internal cylinder 80. Simply stated, at temperatures above 600° C., infrared radiation required to heat the sample S is largely transparent to the quartz. This being the case, total thermal lag of the sample S relative to the furnace due to the presence of the quartz is in the range of 30° C.

I have taken certain steps to minimize safety hazards, which would arise from possible leaks in the system. These hazards stem from the presence of hot oxygen at a high pressure.

1) The volume of oxygen in the system is minimized by reducing the inside diameter and length of the high pressure vessel.

2) The quantity of oxygen can also be further reduced by filling part of the inside space with both internal cylinder 80 and rod 82. Other inert materials could as well be used. Nearly all of the interior of the vessel can be so filled, except for the sample space at the center of the furnace.

3) All valves and connecting tubing are made of metals which have very low heat of combustion such as copper or Monel, etc. and thus will not sustain combustion in case of a leak of hot oxygen.

4) The connecting tube is depressurized and vented to the outside before the temperature of the vessel is increased so that if oxygen leaks back into the tube it will be released safety through the vent.

5) The effects of a possible leak are minimized by using very small bore high pressure connecting tubing, which restricts the rate of gas flow. In case of a valve leak the gas will escape at a safe low rate.

6) The wall of the pressure vessel is very thick in comparison to the bore hole size. The standard pressure rating (given on page III.P-13, "Rules & Procedures for the Design & Operation of Hazardous Research Equipment", Pub. 3001, Lawrence Berkeley Laboratory, University of California) is:

$$P = S(r_o^2 - R_i^2)/(r_o^2 + r_i^2) \quad \text{Equation 1}$$

For the diameters given in FIG. 1:

$$r_o = D/2 = 32 \text{ mm}/2 = 15 \text{ mm}$$

$$r_i = d/2 = 10 \text{ mm}/2 = 5 \text{ mm}$$

thus $P = 0.8\ S$ Equation 2 where $r_o$ = the outer radius, $r_i$ = the inner radius and S = the hoop azimuthal stress in the material (S is highest near the inner diameter of the vessel).

The above is the appropriate calculation for a perfectly elastic material, and this formula must be used if the material is hard or is embrittled by heat treatment before or during use.

However, the material used according to my invention is not subject to hardening or embrittlement. Rather, it is subject to "creep" (i.e. slow, continuous, irreversible elongation under stress at high temperature). The creep is very slow at low stress, but the creep increases rapidly with increasing stress.

According to my invention, when the vessel is filled with high pressure gas and then heated, rapid creep will begin near the inner diameter where the hoop stress is then highest. Then, as the material creeps, the stress near the inner diameter will be reduced and the stress will redistribute itself throughout the entire thickness of the pressure wall. Finally, the stress will be uniform so that the entire wall will expand very slowly and uniformly.

The material stress will thus be reduced and the creep life for stretching and expansion of the vessel (or equivalent of the allowable pressure for a given life) will be increased. The applicable pressure rating in this circumstance is based on the formula for a thin walled vessel (given on page III.P.-12, "Rules & Procedures for the Design & Operation of Hazardous Research Equipment", Pub. 3001, Lawrence Berkeley Laboratory, University of California). The formula is:

$$P = ESt/r_m \quad \text{Equation 3}$$

where E=1 for a single solid vessel with no joints, t=the wall thickness and $r_m$=the means radius.

This formula must be integrated from the inner diameter to the outer diameter of the pressure vessel wall with the result:

$$P = \int_{r_i}^{r_o} S\,dr/r_m(dr) = S\int_{r_i}^{r_o} dr/r = S[\ln(r_o) - \ln(r_i)] \quad \text{Equation 4}$$

In our example $r_o = 16$ mm and $r_i = 5$ mm, then $$P = 1.16\ S \quad \text{Equation 5}$$

This is higher by the factor 1.45 = 1.16/0.8 (Equation 5/Equation 2) than the previous pressure calculation (Equation 2). For thicker walled containers this result is even more favorable, e.g. for $r_o = 5r_i$, $P = 1.61\ S$.

Taking the example o a specific material, Haynes Alloy No. 230, the ultimate tensile strength is 32,000 psi at 982° C. (and 17,300 psi at 1093° C.) (page 6, Haynes Alloy No. 230 booklet), but the stress for 1% creep in 1000 hours at 982° C. is only 2000 psi (see page 5 of the same booklet).

Then, according to Equation 2, the pressure rating would be $P = 0.8\ S = 0.8 \times 2000$ psi = 1600 psi. But using Equation 5, the rating is:

$$P = 1.16\ S = 1.16 \times 2000 \text{ psi} = 2320 \text{ psi}$$

and with a thicker wall ($r_o = 5r_i$):

$$P = 1.61\ S = 1.61 \times 2000 \text{ psi} = 3200 \text{ psi}$$

For example, Haynes No. 230 is 2500 psi for 1000 hours, and for Haynes No. 188 is 2600 psi at 982° C. With the dimensions of our example (outer diameter 32 mm, inner diameter = 10 mm), the result is $P = 1.2\ S.$, a substantial improvement (50%) in the pressure ratings over Equation 2.

Consider another alloy, Haynes Alloy No. 188, a cobalt based alloy (−38% Co, 22% Ni, 22% Cr, 14% W, etc.), which has ultimate tensile strengths 35,200 psi at 980° C. and 18,703 psi at 1093° C., again far in excess of the pressure limits determined by creep. According to the creep specifications given on page 9 of Haynes Alloy No. 188, creep strength at 980° D. is 2100 psi for 1000 hour service life with total creep of 1%. Applying Equation 5 to a vessel with dimensions of our example (32 mm outer diameter and 10 mm inner diameter) we find pressure ratings of 2400 psi against only 1680 psi from Equation 2. This alloy is unsuitable in high pressure $O_2$ because Cobalt Tungstate (an Oxide) forms, and oxidation penetrates into the material.

A third high temperature nickel based heat resistant alloy is Haynes Alloy 214 with ~76% Ni, 16% Cr, 4.5% Al, 3% Fe. This alloy has much higher ultimate strength at 760° C. than Alloy No. 230 or Alloy No. 188

(page 14 of Haynes Alloy No. 214 booklet). However, stress for 1% creep in 1000 hours is only 800 psi at 982° C. (1000° F.) (see graph on page 18 of Haynes Alloy No. 214 booklet). This lower creep rating is because this alloy lacks tungsten and molybdenum which is present in the other two. Haynes Alloy No. 214 is claimed to have "superior resistance to oxidation attack attributed to a tenacious and protective $Al_2O_3$ type film which is modified by a small but effective amount of yttrium" (page 2 of Haynes Alloy No. 214 booklet). Furthermore, this alloy is "precipitation-strengthened" because of the formation of $Ni_3Al$ (gamma prime) (see page 14 of Haynes Alloy No. 214 booklet). It becomes hardened and embrittled if held in the temperature range 595° C.–955° C. (page 19 of Haynes Alloy No. 214 booklet). Even if the furnace is heated above 955° C., part of the pressure vessel will be at a lower (dangerous) temperature. Thus the type of material, although suitable at temperatures below 760° C., is totally unsuitable, (and in fact unsafe) at higher temperatures.

Having set forth the various metallic compounds we have worked with it can be said that the Haynes 230 alloy of the disclosed composition is definitely preferred.

Regarding this alloy, we have learned that it advantageously has a large nickel base exceeding 45%. This nickel when exposed to the high temperature of the oven turns black and forms an ideal infrared heat absorbing body. Additionally, the nickel is ideal for resisting chemical attack under high temperature.

The chromium provides protection against oxygen attack. At least a 15% concentration of chromium is recommended.

Tungsten and molybdenum in the alloy gives preferred reduction to creep. Quantities of tungsten in excess of 10% are required. The remaining elements must be chosen carefully. For example, in the preferred embodiment, iron and cobalt are held to respective 3% and 5% maximums. Cobalt can form and undesired alloy if present in larger amounts. Moreover, molybdenum can form an undesirable alloy with the tungsten if present in amounts substantially exceeding the 2% recommended level.

As has been previously set forth, it is highly desirable that the alloy have the creep properties set forth for the distribution of the inevitably induced hoop stresses. Preferably, the creep properties should occur in a single metallic phase of the metal and should be sufficiently gradual to provide an acceptable in service life. Such creep properties enable stress redistribution in the oven chamber to impart increased in service life.

I claim:

1. A high temperature, high pressure gas furnace comprising in combination:
   a metallic bar fabricated from an alloy having a metallic creep responsive to high temperature stress, said alloy includes at least 45% nickel, 15% chromium, and 10% tungsten;
   said bar defining a vessel having walls, said vessel extending from one end of said bar at least partially to the other end of said bar to form an aperture within said bar;
   said walls being sufficiently thick to permit creep stress redistribution through said bar;
   an oven for receiving said bar;
   a first portion of said bar being inserted into said oven with a second portion of said bar protruding from said oven;
   means for supplying high pressure gas to said vessel form said second portion of said bar whereby a sample placed within said first portion of said bar can be treated at high temperatures and pressures.

2. The invention of claim 1 wherein said composition further includes not more than 2% molybdenum.

3. A high temperature, high pressure gas furnace comprising in combination:
   a metallic bar fabricated from an alloy having a metallic creep responsive to high temperature stress;
   said bar defining a vessel having walls, said vessel extending from one end of said bar at least partially to the other end of said bar to form an aperture within said bar;
   said walls being sufficiently thick to permit creep stress redistribution through said bar;
   an oven for receiving said bar;
   a first portion of said bar being inserted into said oven with a second portion of said bar protruding from said oven;
   means for supplying high pressure gas to said vessel from said second portion of said bar whereby a sample placed within said first portion of said bar can be treated at high temperatures and pressures; and
   a cylinder of fused quartz, said cylinder surrounding said bar as disposed within said oven, said cylinder given a dimension to permit thermal expansion and creep to a predetermined limit and to crack responsive to said thermal expansion and creep when said bar within said oven expands beyond a predetermined limit of creep.

4. A high temperature, high pressure gas furnace comprising in combination:
   a metallic bar fabricated from an alloy having a metallic creep responsive to high temperature stress;
   said bar defining a vessel having walls, said vessel extending from one end of said bar at least partially to the other end of said bar to form an aperture within said bar;
   said walls being sufficiently thick to permit creep stress redistribution through said bar;
   an oven for receiving said bar;
   a first portion of said bar being inserted into said oven with a second portion of said bar protruding from said oven;
   means for supplying high pressure gas to said vessel from said second portion of said bar whereby a sample placed within said first portion of said bar can be treated at high temperatures and pressures; and
   a fused quartz tube disposed within said vessel for inserting a sample within a distal end of said vessel.

5. In a high temperature, high pressure gas furnace having a predetermined length wherein said furnace has a pressure chamber disposed therein the improvement to said pressure chamber comprising:
   a metallic bar fabricated from an alloy having metallic creep responsive to high temperature stress, said alloy including at least 45% nickel, at least 15% chromium, and at least 10% tungsten;
   said bar having an aperture defining a vessel extending from one end of said bar at least partially to the other end of said bar;
   a first portion of said bar inserted interiorly of said furnace with a second portion of said bar protruding from said furnace;

said bar having sufficient length to permit temperatures in the range of 1000° C. within the first portion of said bar with the second portion of said bar remaining approximately at room temperatures;

means connected to the second portion of said bar for admitting high pressure gas; and, means for opening and closing the vessel to permit insertion and withdrawal of a sample.

6. In a high temperature, high pressure gas furnace having a predetermined length wherein a furnace has a pressure chamber disposed therein the improvement to said pressure chamber comprising:

a metallic bar fabricated from an alloy having metallic creep responsive to high temperature stress;

said bar having an aperture defining a vessel extending from one end of said bar at least partially to the other end of said bar;

a first portion of said bar inserted interiorly of said furnace with a second portion of said bar protruding from said furnace;

said bar having sufficient length to permit temperatures in the range of 1000° C. within the first portion of said bar with the second portion of said bar remaining approximately at room temperatures;

means connected to the second portion of said bar for admitting high pressure gas; and, means for opening and closing the vessel to permit insertion and withdrawal of a sample; and a quartz cylinder surrounding said bar, said quartz cylinder given a dimension to permit thermal expansion and creep of said bar responsive to high pressure, high temperature gas within said bar, said quartz cylinder given a dimension of interference with respect to said bar to crack when said bar expands beyond a selected dimension to indicate an end of service life of said bar.

7. In a high temperature, high pressure gas furnace having a predetermined length wherein a furnace has a pressure chamber disposed therein the improvement to said pressure chamber comprising:

a metallic bar fabricated from an alloy having metallic creep responsive to high temperature stress;

said bar having an aperture defining a vessel extending from one end of said bar at least partially to the other end of said bar;

a first portion of said bar inserted interiorly of said furnace with a second portion of said bar protruding from said furnace;

said bar having sufficient length to permit temperatures in the range of 1000° C. within the first portion of said bar with the second portion of said bar remaining approximately at room temperatures;

means connected to the second portion of said bar for admitting high pressure gas; and, an internal quartz cylinder, said internal quartz cylinder extending the length of said bar to permit insertion and withdrawal of a sample within said vessel.

8. A process of high temperature, high pressure gas treatment including the steps of providing a metallic bar forming a vessel, said bar having metallic creep responsive to high temperature stress;

providing a furnace;

inserting a first portion of said bar partially into said furnace with a second portion of said bar protruding from said furnace;

said bar having sufficient length to permit said first portion of said bar to be heated to temperatures in the range of 1000° C. while said second portion of said bar is substantially at room temperature;

inserting a sample into said vessel;

closing said aperture at said second portion of said bar; and supplying high pressure gas to said vessel simultaneously with heating said furnace to a temperature of up to a 1000° C. whereby said sample may be heated for heat treatment.

9. The process of claim 8 and including the step of surrounding said bar with a quartz cylinder, said quartz cylinder dimensioned to permit thermal expansion and creep of said bar up to a predetermined limit and for indicating expansion of said bar beyond said predetermined limit by telltale cracking.

10. The process of claim 8 and wherein said inserting said sample to said bar includes the step of providing a quartz tube for insertion into said vessel;

placing said sample at the end of said tube;

and inserting said tube into said vessel to place said sample within said vessel.

* * * * *